US010019560B2

United States Patent
Onishi (10) Patent No.: US 10,019,560 B2
(45) Date of Patent: Jul. 10, 2018

(54) PASSWORD AUTHENTICATING DEVICE FOR PREVENTING LEAKAGE OF PASSWORDS

(71) Applicant: KYOCERA Document Solutions Inc., Osaka (JP)

(72) Inventor: Seiji Onishi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/719,292

(22) Filed: Sep. 28, 2017

(65) Prior Publication Data

US 2018/0089405 A1 Mar. 29, 2018

(30) Foreign Application Priority Data

Sep. 28, 2016 (JP) .................................. 2016-189151

(51) Int. Cl.
G06F 21/31 (2013.01)
G06F 21/84 (2013.01)

(52) U.S. Cl.
CPC ............. *G06F 21/31* (2013.01); *G06F 21/84* (2013.01)

(58) Field of Classification Search
CPC .................................. G06F 21/31; G06F 21/84
See application file for complete search history.

(56) References Cited

U.S. PATENT DOCUMENTS

| 5,267,299 | A | * | 11/1993 | Nomura | H04M 1/651 340/5.74 |
| 9,813,589 | B2 | * | 11/2017 | Kakutani | H04N 1/4413 |
| 9,910,975 | B2 | * | 3/2018 | Yang | G06F 21/36 |
| 2003/0172281 | A1 | * | 9/2003 | Lee | G06F 21/31 713/183 |
| 2005/0160297 | A1 | * | 7/2005 | Ogawa | G06F 21/31 726/19 |
| 2007/0198847 | A1 | * | 8/2007 | Watari | G06F 21/36 713/184 |

(Continued)

FOREIGN PATENT DOCUMENTS

| JP | 2004-326525 A | 11/2004 |
| JP | 2009-223470 A | 10/2009 |
| JP | 2014-056345 A | 3/2014 |

*Primary Examiner* — Joseph P Hirl
*Assistant Examiner* — Stephen Gundry
(74) *Attorney, Agent, or Firm* — Hawaii Patent Services; Nathaniel K. Fedde; Kenton N. Fedde (57) ABSTRACT

Provided is a password-authenticating device in which a password is not perceived from the hand movements of an operator during entry of a password. The password-authenticating device according to the present disclosure executes a login process by comparing an entered password candidate with a registered password. The password-authenticating device includes a comparison unit, and an authenticating unit. The comparison unit receives entry of the password candidate together with a number of times of dummy input, and when the entered password candidate matches the registered password, receives re-entry of the password candidate. After re-entry of the password candidate reaches the number of times of dummy input, the authenticating unit executes the login process regardless of whether or not the re-entered password candidate matches the registered password.

7 Claims, 6 Drawing Sheets

(56) References Cited

U.S. PATENT DOCUMENTS

| | | | |
|---|---|---|---|
| 2010/0333198 A1* | 12/2010 | Mikake | G06F 3/03547 726/19 |
| 2012/0110663 A1* | 5/2012 | Kim | G06F 21/36 726/19 |
| 2012/0144477 A1* | 6/2012 | Katayama | G06F 21/31 726/19 |
| 2012/0192268 A1* | 7/2012 | Wang | G06F 21/36 726/19 |
| 2013/0127725 A1* | 5/2013 | Sugimoto | G06F 3/02 345/168 |
| 2013/0318597 A1* | 11/2013 | Parsons | G06F 21/36 726/19 |
| 2014/0090035 A1* | 3/2014 | Kodama | G06F 21/31 726/6 |
| 2014/0150117 A1* | 5/2014 | Yamahara | G06F 21/31 726/28 |
| 2014/0189885 A1* | 7/2014 | Golan | G06F 21/32 726/28 |
| 2014/0201831 A1* | 7/2014 | Yi | G06F 21/31 726/19 |
| 2014/0201832 A1* | 7/2014 | Yi | G06F 21/31 726/19 |
| 2014/0317415 A1* | 10/2014 | Sun | G06F 21/36 713/183 |
| 2015/0135291 A1* | 5/2015 | Yang | G06F 21/31 726/6 |
| 2015/0193615 A1* | 7/2015 | Hosoda | G06F 21/31 726/18 |
| 2015/0205942 A1* | 7/2015 | Yang | G06F 21/31 726/19 |
| 2015/0310201 A1* | 10/2015 | Sugiyama | H04W 12/12 726/7 |
| 2015/0312242 A1* | 10/2015 | Ogawa | G06F 21/34 726/6 |
| 2016/0212119 A1* | 7/2016 | Yang | H04L 63/083 |
| 2016/0358390 A1* | 12/2016 | Imada | G07C 9/00174 |
| 2016/0378961 A1* | 12/2016 | Park | G06F 21/32 726/19 |
| 2017/0154173 A1* | 6/2017 | Wang | G06F 21/31 |
| 2017/0185806 A1* | 6/2017 | Kong | G06F 21/83 |
| 2018/0089404 A1* | 3/2018 | Uchida | G06F 21/31 |
| 2018/0089406 A1* | 3/2018 | Fujiwara | G06F 21/31 |

\* cited by examiner

PASSWORD AUTHENTICATING DEVICE FOR PREVENTING LEAKAGE OF PASSWORDS

INCORPORATION BY REFERENCE

This application is based on and claims the benefit of priority from Japanese Patent Application No. 2016-189151 filed on Sep. 28, 1016, the contents of which are hereby incorporated by reference.

BACKGROUND

The present disclosure relates to a password-authenticating device for preventing leakage of passwords.

In an image forming apparatus such as a copier, a printer, a multifunctional peripheral and the like, or in an information-processing apparatus such as a computer and the like, a user-authenticating function that uses passwords may be provided. From the aspect of maintaining security, it is necessary to prevent leakage of passwords to a third party. Therefore, technology is proposed that hides displayed characters and symbols when entering a password. Furthermore, technology is also proposed that hides displayed characters and symbols in stages according to distance when entering a password.

SUMMARY

The password-authenticating device according to the present disclosure executes a login process by comparing an entered password candidate with a registered password. The password-authenticating device is equipped with a comparison unit and an authenticating unit. The comparison unit receives entry of the password candidate together with the number of times of dummy input, and when the entered password candidate matches the registered password, the comparison unit receives re-entry of the password candidate the number of times of dummy input. After re-entry of the password candidate reaches the number of times of dummy input, the authenticating unit executes the login process regardless of whether or not the re-entered password candidate matches the registered password.

Moreover, the password-authenticating device according to the present disclosure executes a login process by comparing an entered password with a registered password. The password-authenticating device is equipped with a first input unit, a second input unit, a comparison unit, and an authenticating unit. The first input unit and a second input unit are for entering a password candidate. The comparison unit receives entry of the password candidate, and when the entered password candidate matches the registered password, receives re-entry of the password candidate. The authenticating unit, after re-entry of the password candidate from one of either the first input unit or the second input unit has reached a number of times of dummy input, executes the login process regardless of whether or not the re-entered password candidate matches the registered password.

DETAILED DESCRIPTION

In the following, embodiments according to the present disclosure will be explained in detail with reference to the drawings.

First Embodiment

A password-authenticating device 1 of a first embodiment is a device that receives entry of a password by an operator as a password candidate for comparison, and performs authentication of the entered password. The password-authenticating device 1, referring to FIG. 1, includes a touch panel 10, a storage unit 20, a control unit 30 and a communication unit 40.

Figure 1:
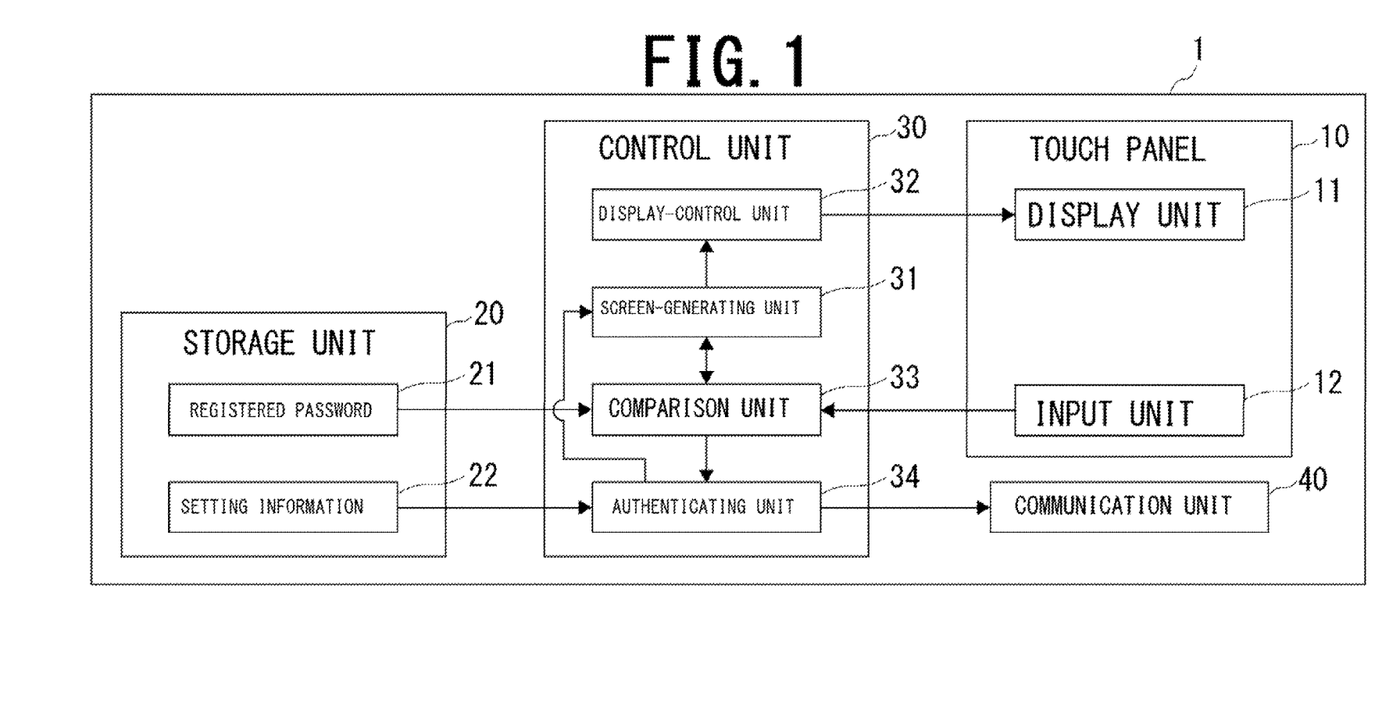
FIG. 1 illustrates an overview of the configuration of a first embodiment of a password-authenticating device according to the present disclosure.

The touch panel 10 is provided with transparent pressure-sensitive sensors on the front surface of a display panel such as a liquid-crystal display panel. The display panel of the touch panel 10 functions as a display unit 11 for displaying various operation keys and the password entry status. The pressure-sensitive sensors of the touch panel 10 function as an input unit 12 that receives entry of a password and various operations.

The storage unit 20 is storage means such as a semiconductor memory or the like. The storage unit 20 stores a registered password 21 and setting information 22. The registered password 21 and setting information 22 are registered and stored in the storage unit 20 during initial setup or when a new user is registered.

The control unit 30 is an information processing unit such as a microcomputer and the like that includes a CPU, ROM, RAM and the like. The ROM stores a control program for performing operation control of the password-authenticating device 1. The CPU of the control unit 30 performs overall control of the device by reading the control program that is stored in the ROM and expanding that control program in the RAM. Moreover, the control unit 30 functions as a screen-generating unit 31, a display-control unit 32, a comparison unit 33 and an authenticating unit 34.

The communication unit 40 has a function of transmitting data to a pre-registered destination (portable terminal and the like) via a network such as the Internet, LAN and the like.

During initial setup, or when registering a new user or the like, the screen-generating unit 31 generates a login-authentication-setting screen for receiving the registration of a registered password 21 and setting information 22. Moreover, the display-control unit 32, during initial setup or when registering a new user or the like, as illustrated in FIG. 2, causes the login-authentication-setting screen to be displayed on the touch panel 10.

Figure 2:
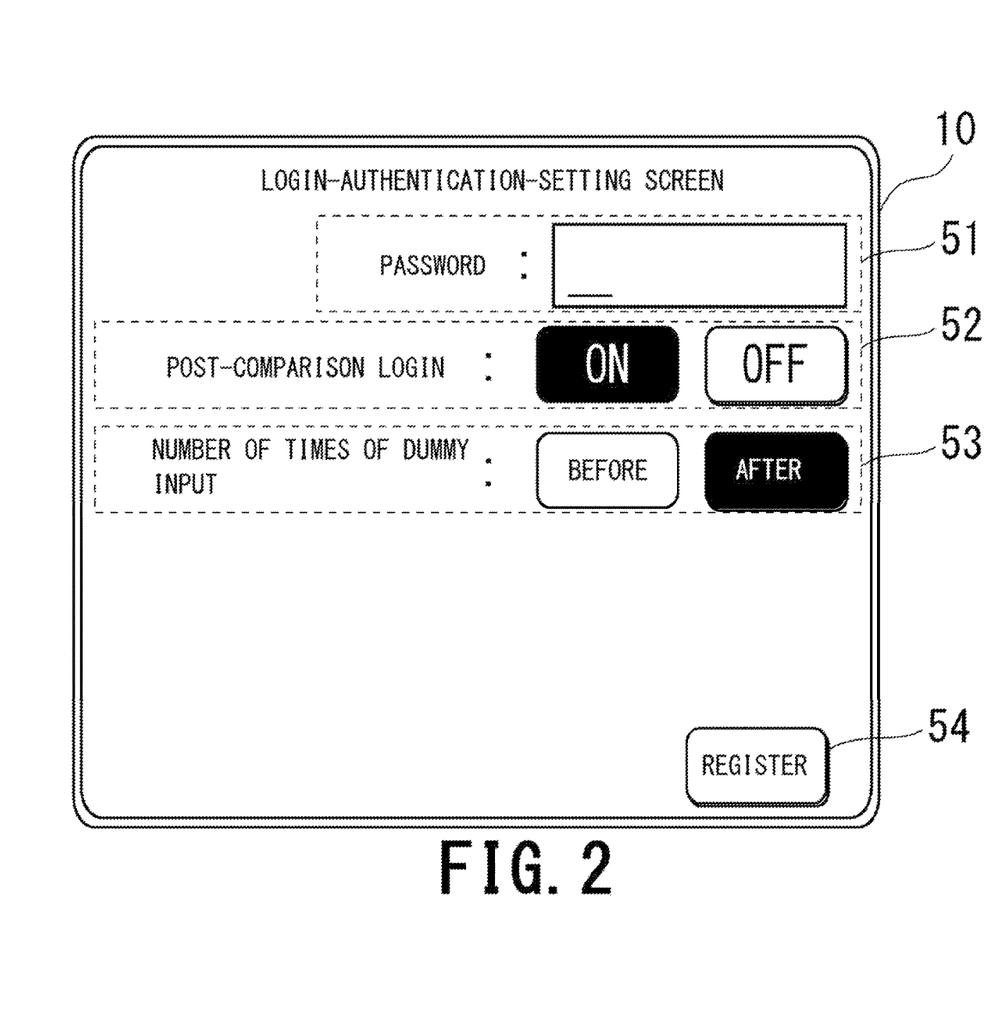
FIG. 2 illustrates an example of a login-authentication-setting screen that is displayed on the touch panel illustrated in FIG. 1.

On the login-authentication-setting screen, as illustrated in FIG. 2, there are a password-registration field 51, a post-comparison-login-selection field 52, an input-position-setting field 53 and a registration key 54.

The password-registration field 51 is a field for entering a registered password. In this embodiment, the registered password 21 is presumed to be a number string.

The post-comparison-login-selection field 52 is a field for selecting ON/OFF for whether or not to execute a post-comparison login operation, and the selection is registered as the setting information 22. The post-comparison login operation is an operation that is a feature of the password-authenticating device 1 of this embodiment, and is an operation in which the password cannot be perceived from the hand movement of the operation when entering the password. When OFF is selected in the post-comparison-login-selection field 52, the post-comparison-login operation is not executed, and login operation of a typical example is executed in which whether or not to perform login is determined according to whether or not an entered password matches the registered password 21.

The input-position-setting field 53 is a field for setting whether to perform the input of the setting for the number of times of dummy input N before the password or after the password, and that setting is registered as setting information 22.

Next, the post-comparison-login operation for the case in which ON is selected in the post-comparison-login-selection field 52 will be explained in detail with reference to FIG. 3 to FIG. 6.

Figure 3:
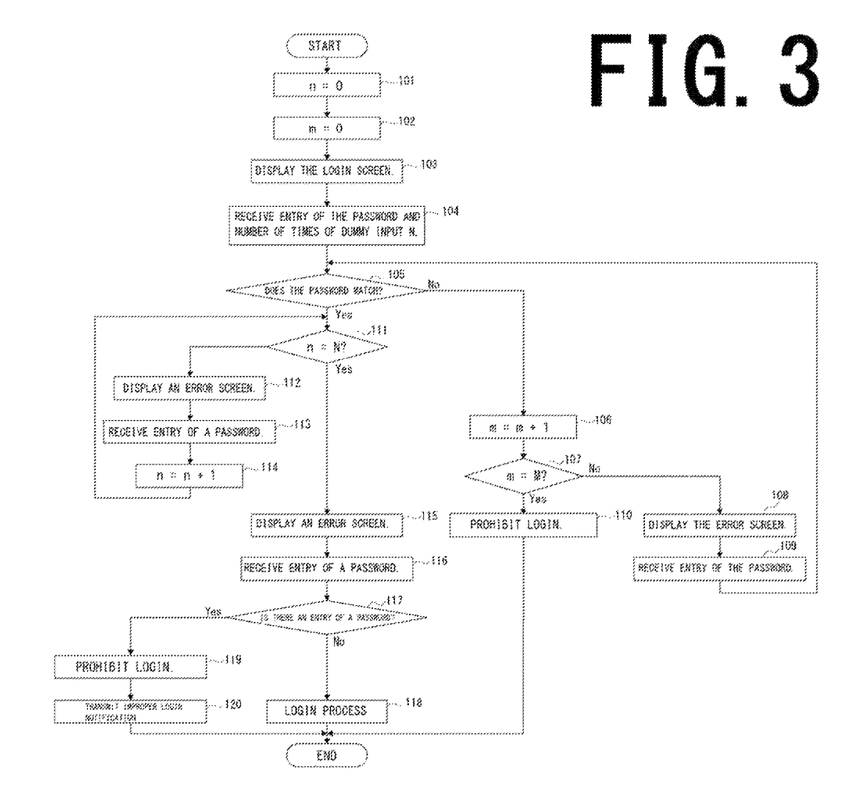
FIG. 3 illustrates the login operation after comparison in a first embodiment of a password-authenticating device according to the present disclosure.

Referring to FIG. 3, first, the control unit 30 initializes a variable n to 0 (step 101), and initializes a variable m to 0 (step 102).

Figure 4:
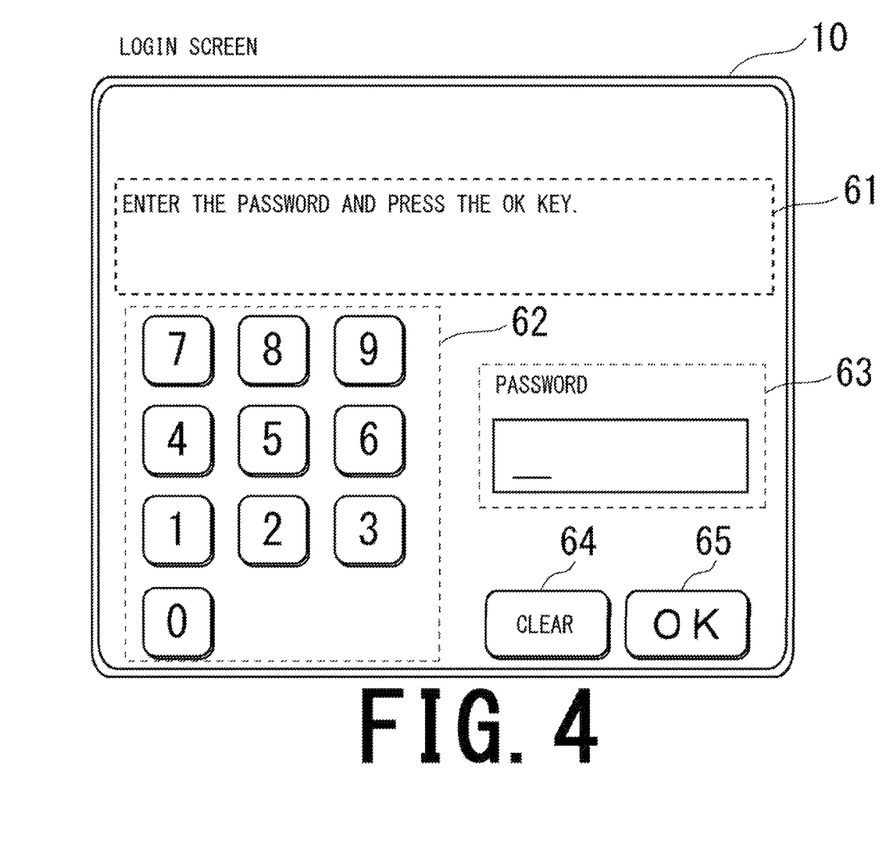
FIG. 4 illustrates an example of a login screen that is displayed on the touch panel illustrated in FIG. 1.

Next, the screen-generating unit 31 generates a login screen for receiving entry of a password, and the display-control unit 32, as illustrated in FIG. 4, displays the login screen on the touch panel 10 (step 103).

As illustrated in FIG. 4, an input guide message 61 for providing guidance for entering a password, a ten-key 62, a password-input field 63, a clear key 64, and an OK key 65 are arranged on the login screen. The OK key 65 on the login screen is an operation key for giving an instruction to receive the password that is entered in the password-input field 63.

On the login screen, the operator operates the ten-key 62 and enters the password and the number of times of dummy input N into the password-input field 63, and operates the OK key 65. In the setting information 22, when the input position is set to be before the password, the password is entered after entering the number of times of dummy input N in the password-input field 63. In the setting information 22, when the input position is set to be after the password, the number of times of dummy input N is entered after password in the password-input field 63.

For example, in a case in which a password "35789" and number of times of dummy input N "2" are entered, and when the input position in the setting information 22 is set to be before the password, "235789" is entered into the password-input field 63. When the input position in the setting information 22 is set to be after the password, "357892" is entered into the password-input field 63.

When the OK key 65 is operated on the login screen, the comparison unit 33 receives the password and number of times of dummy input N from the input in the password-input field 63 based on the input position in the setting information 22 (step 104), and determines whether the password matches the registered password 21 (step 105).

In step 105, when the password that is entered into the password-input field 63 and the registered password 21 do not match, the authenticating unit 34 increments the variable m (step 106), and determines whether or not the variable m has reached a preset upper limit of number of inputs M (step 107). The variable m indicates the number of times that a wrong password is entered.

In step 107, when the variable m has not reached the upper limit of number of times of input M, the screen-generating unit 31 notifies that the password is wrong and that login failed, then generates an error screen for receiving re-entry of the password. Moreover, the display-control unit 32, as illustrated in FIG. 5, displays the error screen on the touch panel 10 (step 108).

Figure 5:
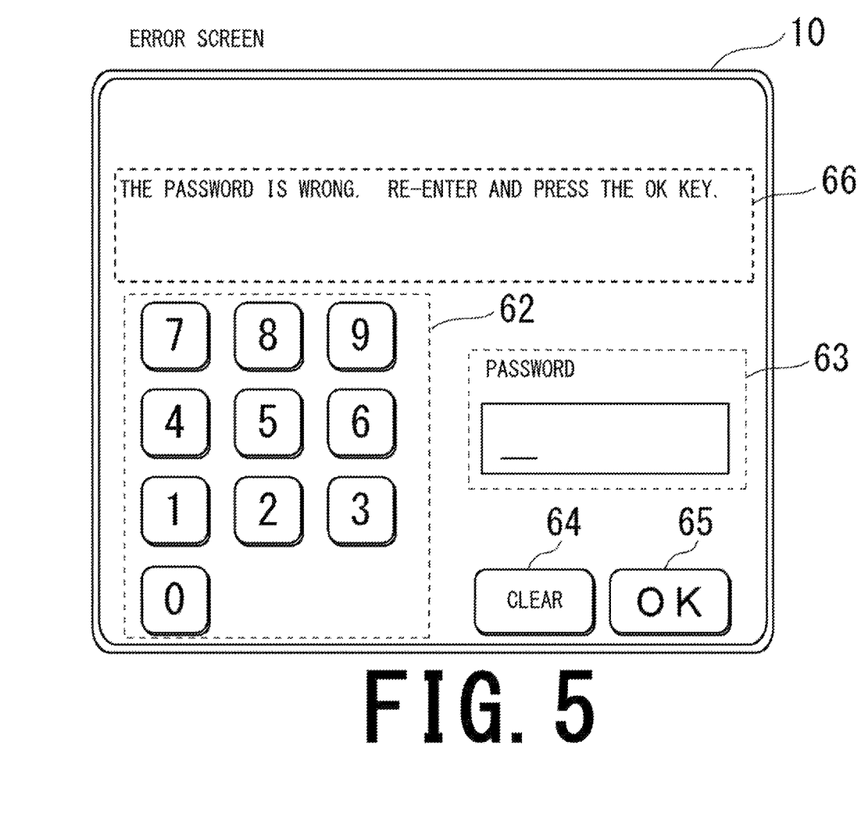
FIG. 5 illustrates an example of an error screen that is displayed on the touch panel illustrated in FIG. 1.

As illustrated in FIG. 5, an error-guidance message 66 for guiding re-entry of the password, a ten-key 62, a password-input field 63, clear key 64, and an OK key 65 are arranged on the error screen. The OK key 65 on the error screen is an operation key for giving an instruction to receive a password that is re-entered into the password-input field 63. On the login screen, the operator re-enters a password into the password-input field 63 by operating the ten-key 62, and then operates the OK key 65.

When the OK key 65 is operated on the error screen, the comparison unit 33 receives the password that is re-entered in the password-input field 63 (step 109), then processing returns to step 105 and the comparison unit 33 determines whether or not the re-entered password and the registered password 21 match.

In step 107, when the variable m has reached the upper limit of the number of times of input M, the authenticating unit 34 prohibits login with that password (step 110), and ends the post-comparison-login operation.

In step 105, when the password that is entered into the password-input field 63 and the registered password 21 match, the authenticating unit 34 determines whether or not the variable n has reached the received number of times of dummy input N (step 111).

In step 111, when the variable n has not reached the number of times of dummy input N, the screen-generating unit 31 generates an error screen for receiving re-entry of a password, and the display-control unit 32, as illustrated in FIG. 5, displays the error screen on the touch panel 10 (step 112).

When the OK key 65 is operated on the error screen, the comparison unit 33 receives the password that is re-entered into the password-input field 63 (step 113).

In step 113, when the re-entered password is received, the comparison unit 33 does not determine whether or not the received password and the registered password 21 match, and the authenticating unit 34 increments the variable m (step 114), then processing returns to step 111.

As a result, re-entry of a password on the error screen in step 113 is repeated until the variable n reaches the number of times of dummy input N. The password that is re-entered in step 113 is not determined to match the registered password 21, so the operator is able to enter a dummy password that is different than the registered password 21. Moreover, in step 111 to step 114, the variable m is not incremented, the variable m does not reach the upper limit of the number of inputs M, and login using the password is not prevented by the input of a dummy password.

In step 114, when the variable n has reached the number of times of dummy input N, the screen-generating unit 31 generates an error screen for receiving re-entry of a password, and the display-control unit 32, as illustrated in FIG. 5, displays the error screen on the touch panel 10 (step 115).

A proper operator keeps the password-input field 63 on the error screen that is displayed in step 115 empty, and operates the OK key 65.

However, an improper operator will not know the number of times of dummy input N, so will re-enter a password in the password-input field 63 by operating the ten-key 62, and then operate the OK key 65.

In step 115, when the OK key 65 is operated on the login completion screen (or error screen), the comparison unit 33 receives the password that is re-entered in the password-input field 63 (step 116), and determines whether or not the password is entered (step 117).

In step 117, when a password is not entered, the authenticating unit 34 executes the login process (step 118), and ends the post-comparison login operation.

In step 117, when a password is entered, the authenticating unit 34 recognizes the login as an improper login, and prohibits login using that password (step 119). Together with this, the authenticating unit 34 transmits an improper-login notification via the communication unit 40 to a pre-registered destination (portable terminal or the like) in order to notify that there is an improper login attempt (step 120), and ends the post-comparison login operation.

In step 111, when the variable n has reached the number of time of dummy input N, the authenticating unit 34 may immediately execute the login process in step 118. In this case as well, the login process is executed using a dummy password, so it is possible to prevent the password from being perceived from the hand movements of the operating during entry of the password.

Moreover, when the number of times of dummy input is "0", this means that re-entry of the password is not received in step 113, and it is thought that the operator is urgently requiring login. Therefore, when the number of times of dummy input N that is received in step 104 is "0", when the password that is entered in the password-input field 63 and the registered password 21 match in step 105, the authenticating unit 34 is preferably configured so as to immediately execute the login process in step 118.

As explained above, the first embodiment is a password-authenticating device 1 that executes a login process by comparing an entered password with a registered password 21. The password-authenticating device 1 includes a comparison unit 33, and an authenticating unit 34. The comparison unit 33 receives the password and the number of times of dummy input N, and when the entered password matches the registered password 21, receives re-entry of the password the set number of times of dummy input N. The authenticating unit 34 executes the login process after re-entry of the password the number of times of dummy input N is received by the comparison unit 33 regardless of whether or not the re-entered password matches the registered password 21.

With this configuration, by entering a dummy password after a password that matches the registered password 21 is entered, the login process is executed. Therefore, even when the pressed positions are seen during operation when entering the password, it is not possible to identify by which password the login process is executed, so it is possible to prevent a proper password from being perceived from the hand operation of the operator when entering the password. Moreover, the setting for the number of times of dummy input N is not set in advance, and can be performed arbitrarily when entering the password, making it even more difficult to perceive the password.

Furthermore, with this first embodiment, a password-input field 63 in which a password is entered, and an OK button 65 that instructs the comparison unit 33 to receive a password that is re-entered in the password-input field 63 are arranged. Moreover, a touch panel 10 that displays an error screen for notifying that login failed is provided. After the re-entry of a password the number of times of dummy input N is received by the comparison unit 33, the OK key 65 is operated on the error screen in a state in which the password-input field 63 is empty, the authenticating unit 34 executes the login process. Moreover, when the OK key 65 is operated on the error screen in a state in which a password is re-entered in the password-input field 63, the authenticating unit 34 prohibits login.

With this configuration, it is possible to prevent improper login by a third party. In other words, a third party that does not know the number of times of dummy input N will re-enter a password on the error screen even after re-entry of the password of the number of times of dummy input N is received by the comparison unit 33.

Furthermore, with this first embodiment, a communication unit 40 is provided for transmitting data to a registered terminal via a network. Moreover, when the OK key 65 is operated on the error screen in a state in which a password is entered into the password-input field 63 after re-entry of the password the number of times of dummy input N is received by the comparison unit 33, the authenticating unit 34 transmits a notification of improper login to the terminal via the communication unit 40.

With this configuration, it is possible to notify the manager or the like of improper login by a third party.

Furthermore, with the first embodiment, when input of 0 times is received as the number of times of dummy input N, and the entered password matches the registered password 21, the comparison unit 33 does not receive the re-entered password, and the authenticating unit 34 executes the login process.

With this configuration, it is possible to simplify the post-comparison login operation during an emergency.

Second Embodiment

Figure 6:
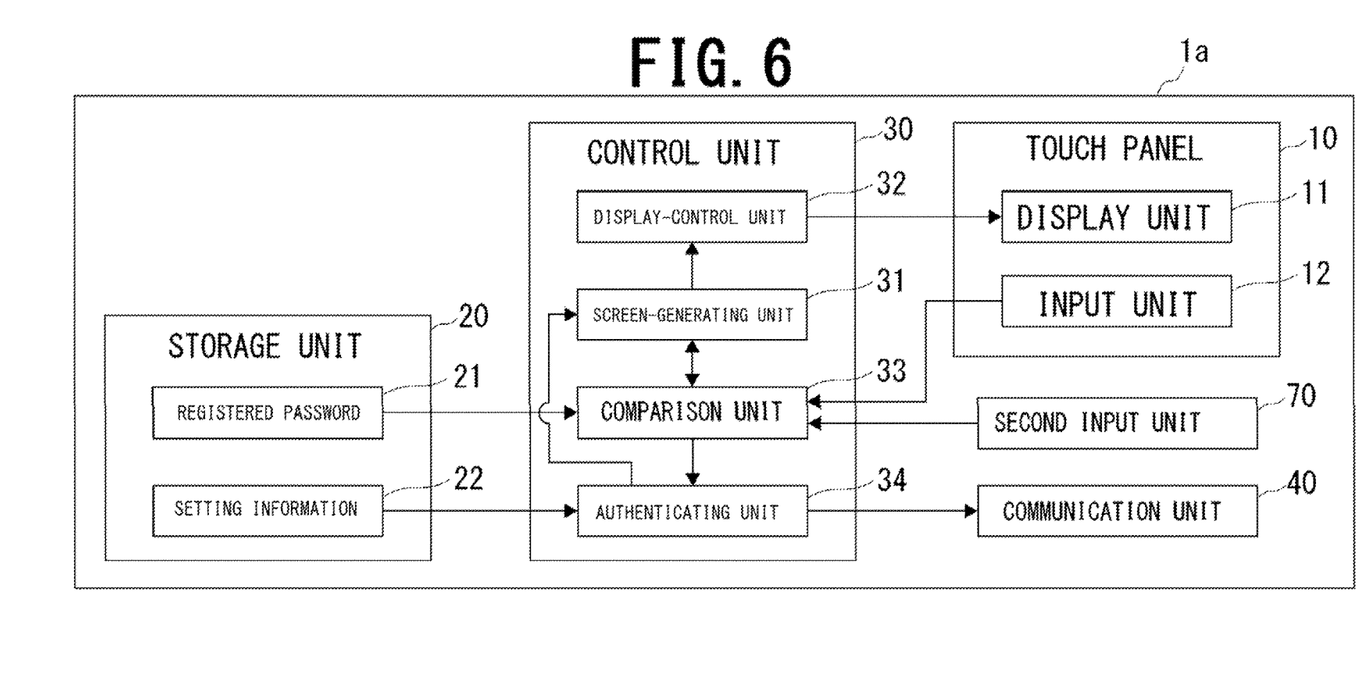
FIG. 6 illustrates an overview of the configuration of a second embodiment of a password-authenticating device according to the present disclosure.

A password-authenticating device 1a of a second embodiment, referencing FIG. 6, is such that in addition to the configuration of the first embodiment, a second input unit 70 is provided. The second input unit 70 includes a hard keyboard, for example, for entering a password and number of times of dummy input N by a separate route from the input unit 12 of the touch panel 10.

In this second embodiment, when a dummy password is received in step 114, the comparison unit 33 determines whether the password is entered from the input unit 12 of the touch panel 10 or the second input unit 70, and sets whether or not to increment the variable n in step 115. In other words, the comparison unit 33 counts only the dummy passwords that are entered from one of either the input unit 12 of the touch panel 10 or the second input unit 70.

The input destination for counting the dummy passwords can be set based on the input destination where the correct password is entered in step 105. For example, when the input destination where the correct password is entered in step 105 is the input unit 12 of the touch panel 10, the input destination for incrementing the variable n (count of the dummy password) is only the second input unit 70.

With this second embodiment, it is possible for the operator to suitably separate the use of the input unit 12 of the touch panel 10 and the second input unit 70, so it is possible to arbitrarily change the number of times of input of a dummy password, making it difficult to know the number of times of dummy input N. Therefore, in this second embodiment, in step 104, input of the number of times of dummy input N is not received, and it is possible to use a set value as the number of times of dummy input N.

As explained above, the second embodiment is a password-authenticating device 1a that executes a login process by comparing an entered password with a registered password. The password-authenticating device 1a includes an input unit 12, a second input unit 70, a comparison unit 34, and an authenticating unit 34. The input unit 12 and the second input unit 70 are for entering passwords. The comparison unit 34 receives an entered password, and when the entered password matches a registered password 21, receives re-entry of a password. After re-entry of a password from one of either the input unit 12 or the second input unit 70 reaches the number of time of dummy input N, the authenticating unit 34 executes a login process regardless of whether or not the re-entered password matches the registered password 21.

With this configuration, it is possible for the operator to suitably separate the use of the input unit 12 of the touch panel 10 and the second input unit 70, so it is possible to arbitrarily change the number of times of input of a dummy password, which makes it difficult to know the number of times of dummy input N.

Furthermore, with the second embodiment, the authenticating unit 34 sets the input destination for counting the arrival at the number of times of dummy input N to one of either the input unit 12 or the second input unit 70 based on the input unit 12 or the second input unit 70 where a password that matches the registered password 21 is entered.

With this configuration, the input destination for counting the arrival at the number of times of dummy input N is switched, so it becomes more difficult to know the number of times of dummy input N.

In a typical example, even though it is possible to hide the entered characters, there is a problem in that a password can be perceived and leaked from the hand movements of the operator (positions pressed during keyboard operation) when entering a password.

According to the present disclosure, after a password that matches the registered password is entered, by entering dummy passwords the number of times of dummy input that is entered together with the password, the login process is executed. Therefore, even when the positions that are pressed during operation when entering a password are seen, it is not possible to identify for which password the login process is executed, so there is an effect of being able to prevent a correct password from being perceived from the hand movements of the operator when entering a password.

The technology according to the present disclosure is not limited to the embodiments described above, and it is clear that it is possible to suitably change the embodiments within the technical scope of the present disclosure.

What is claimed is:

1. A password-authenticating device that executes a login process by comparing an entered password candidate with a registered password, comprising a display unit, a comparison unit, and an authenticating unit, wherein:
    the comparison unit receives entry of the password candidate and a number, wherein the entry of the password candidate is received from a user-input field that is indicated to the user as a password-entry field by the display unit;
    the comparison unit uses the received number to set a number of times to receive entry of a dummy input, wherein each received dummy input is a user input that is not required to match the registered password;
    the comparison unit receives said dummy input entry the set number of times;
    the entry of each dummy input is received from a user-input field that the display unit indicates as a password-entry field;
    the display unit prompts for said dummy input entry the set number of times when the entered password candidate matches the registered password;
    the authenticating unit determines whether the number of times has been reached for receiving said dummy input entry; and
    the authenticating unit, when the entered password candidate matches the registered password and when the set number of times has been reached for receiving said dummy input entry, executes the login process regardless of whether or not any received dummy input entry matches the registered password.

2. The password-authenticating device according to claim 1, wherein
    the display unit, when the entered password candidate matches the registered password, displays a first error screen comprising:
        a notification that login failed;
        an input field that is indicated by the display as a password-entry field; and
        an operation key, wherein operation of the operation key instructs the comparison unit to receive, as an occurrence of said dummy input entry, a user-entry that is entered into the input field of the first error screen;
    after said dummy input entry has been received the set number of times, the display unit displays, as a login-completion screen, a second error screen comprising;
        a notification that login failed;
        an input field that is indicated by the display as a password-entry field; and
        an operation key, wherein operation of the operation key of the second error screen instructs the comparison unit to receive a user entry that is entered into the input field of the second error screen; and
    the authenticating unit i) executes the login process based on whether the operation key of the second error screen is operated in a state in which the input field of the second error screen is empty, ii) executes the login process only when the operation key of the second error screen is operated in a state in which the input field of the second error screen is empty, and iii) prohibits login when the operation key of the second error screen is operated in a state in which a user entry is entered into the input field of the second error screen.

3. The password-authenticating device according to claim 2, further comprising a communication unit for transmitting data to a registered terminal via a network; wherein
    when the set number of times for receiving said dummy input entry has been reached, and the operation key of the second error screen is operated in a state in which a user entry is entered into the input field of the second error screen, the authenticating unit transmits an improper login notification to the terminal using the communication unit.

4. The password-authenticating device according to claim 1, wherein
    when the comparison unit receives an entry of zero as the received number, the comparison sets the number of times as zero, and when the entered password candidate matches the registered password, the comparison unit does not receive said dummy input entry and the authenticating unit executes the login process.

5. A password-authenticating device that executes a login process by comparing an entered password candidate with a registered password, and comprising:
   a first input interface for receiving entries from a user;
   a second input interface for receiving entries from a user, wherein the second input interface is different than the first input interface;
   a comparison unit:
     sets a number of times to receive entry of a dummy input, wherein each received dummy input is a user input that is not required to match the registered password; and
     receives entry of the password candidate from the first input interface or the second input interface, and when the entered password candidate matches the registered password, receives said dummy input entry the set number of times; and
   an authenticating unit that, after the set number of times has been reached for receiving said dummy input entry and said receiving of said dummy input entry the set number of times occurred from one of either the first input interface or the second input interface, executes the login process regardless of whether or not any received dummy input entry matches the registered password.

6. The password-authenticating device according to claim 5, wherein
   the authenticating unit
     counts the number of times said dummy input entry has been received from an input destination selected from one of the first input interface and the second input interface;
     sets, as the input destination from which dummy input entries are counted, one of either the first input interface and the second input interface based on which of the first input interface and the second input interface was used to enter the password candidate that matches the registered password; and
     compares the counted number of times to the set number times to determine whether said dummy input entry has been received the set number of times.

7. The password-authenticating device according to claim 6, wherein
   the authenticating unit
     sets the first input interface as the input destination from which dummy input entries are counted when the second input was used to enter the password candidate that matches the registered password; and
     sets the second input interface as the input destination from which dummy input entries are counted when the first input was used to enter the password candidate that matches the registered password.

* * * * *